Patented Apr. 2, 1946

2,397,628

UNITED STATES PATENT OFFICE 2,397,628

SYNTHESIS OF AMINO ACIDS

Harold R. Snyder, Urbana, Ill., assignor to Merck & Co., Inc., Rahway, N. J., a corporation of New Jersey No Drawing. Application August 21, 1942, Serial No. 455,609

11 Claims. (Cl. 260—268)

This invention relates to an improved process for the production of the important amino acid, dl-methionine.

When proceeding in accordance with my invention, relatively inexpensive and readily available materials are utilized, and dl-methionine is obtained in high yield, by a process involving only a few comparatively simple manipulations.

In accordance with my invention, α-oximino-gamma-butyrolactone is obtained as a first step, by the reaction of acetobutyrolactone and ethyl nitrite. In carrying out this step, the ethyl nitrite, preferably, may be generated by the action of hydrochloric acid on sodium nitrite dissolved in aqueous ethanol, and the gas thus produced may be condensed directly in the reaction vessel.

In accordance with my invention and as a further embodiment thereof, I have found it advantageous to insure the presence of small amounts of a mineral acid in the ethyl nitrite, for example, traces of hydrochloric acid or sulfuric acid. Such small amounts of mineral acid appear to exercise a directive or catalytic effect on the reaction between the nitrite and the acetobutyrolactone. It is preferred to add the ethyl nitrite to the acetobutyrolactone in the cold; temperatures of 0° C. to —5° C. have been found suitable. During the reaction, the temperature rises to 15° to 40° C., and is preferably maintained at about that temperature, which may be accomplished by the provision of any appropriate cooling means. The time required for the reaction may vary somewhat, but, generally speaking, reaction is complete within from 15 to 20 hours. During the latter part of the reaction period, the excess ethyl nitrite tends to evaporate partially and may be removed in any suitable manner, as by conduction to the outside through a rubber tube, or the like.

After the reaction has been completed, the solution is filtered, and since some unchanged ethyl nitrite may be present in the solution, it is desirable to provide adequate ventilation during the filtration step. The reaction product, α-oximino-gamma-butyrolactone, is recovered, and if desired, may be further purified by recrystallization.

The thus obtained α-oximino-gamma-butyrolactone is catalytically hydrogenated. The catalyst may be a hydrogenation catalyst, such as nickel or palladium, and may be a supported catalyst, as, for example, charcoal-supported palladium chloride. When utilizing such a charcoal-supported palladium chloride as catalyst, it is preferred to use the equivalent of about 5% metallic palladium.

The 3,6-bis-(β-hydroxy ethyl)-2,5-diketopiperazine obtained by dimerization of the reduction product, which occurs on standing, is treated with a suitable chlorinating or brominating agent, such as thionyl chloride, phosphorous oxychloride, phosphorous pentachloride, thionyl bromide, phosphorous tribromide, or phosphorous oxybromide.

In general, it is advantageous to utilize an excess of thionyl chloride, to prevent undue thickening of the mixture. The excess thionyl chloride may be removed, after completion of the chlorinating reaction, by the addition of ether or by decantation or filtration.

The thus obtained chloro compound, 3,6-bis-(β-chloro-ethyl)-2,5-diketopiperazine may be recovered, and reacted with an alkali metal salt of methyl mercaptan, as for instance, sodium methyl mercaptide, in the presence of a solvent such as methanol, ethanol, or absolute alcohol. The resultant product, 3,6-bis-(β-methyl thiol-ethyl)-2,5-diketo-piperazine, is hydrolyzed, preferably in acid medium, and dl-methionine is recovered in high yield.

The following examples illustrate methods of carrying out the present invention, but it is to be understood that these examples are given by way of illustration and not of limitation.

Example I

Concentrated hydrochloric acid is added dropwise to a solution of 150 gms. of sodium nitrite in 375 cc. of water containing 120 cc. of 95% ethanol. The ethanol is added to the solution after the nitrite is dissolved in water. The ethyl nitrite generated is passed through a calcium chloride tower and condensed in an ice-cooled receiver.

A solution of 128 gms. (111 cc., 1 mol) of redistilled acetobutyrolactone in 300 cc. of methanol is prepared in a one-liter, 3-necked flask equipped with a stirrer and a reflux condenser. The flask is immersed in a bucket of ice-salt, and when the temperature reaches —5° C., 100 cc. (90 gms., 1.2 mols) of cold ethyl nitrite is added. The mixture is stirred for 15 hours, at the end of which time the cooling bath is removed and the mixture is heated to reflux for 15 minutes. The condenser is then set downward, and the methanol is distilled. The crystalline residue contains some oily material. After washing with thiophene-free benzene, the product is heated to reflux with 100 cc. of isopropyl alcohol, cooled to 0°

C., filtered, and washed with two 50 cc. portions of cold isopropyl alcohol. Crystalline α-oximino-gamma-butyrolactone, melting point 183°–185° C., with decomposition, is obtained.

A solution of 40 gms. of the oxime, α-oximino-gamma-butyrolactone in 350 cc. of methanol is treated with hydrogen over Raney nickel at 50° C., for about one hour, and at an initial pressure of 2000 lbs. The catalyst is filtered, and the solvent evaporated. The liquid residue is recrystallized from the minimum quantity of absolute ethanol (about 500 cc.). Crystalline 3,6-(β-hydroxy ethyl)-2,5-diketopiperazine, melting point, 186° C., is obtained.

5 gms. of 3,6-bis-(β-hydroxy ethyl)-2,5-diketopiperazine are added in small amounts to 10 cc. of thionyl chloride. The mixture gradually thickens. An additional 5 cc. of thionyl chloride is added. The mixture is stirred until no further evolution of gas occurs. It is then warmed on the water bath until nearly dry, and treated with ice and water, after which it is filtered and washed with water. 5 gms. (86%) of 3,6-bis-(β-chlor-ethyl)-2,5-diketopiperazine are obtained; melting point, 219°–221° C. After recrystallization from absolute alcohol, the product melts at 224–225° C.

1 gm. of 3,6-bis-(β-chloro-ethyl)-2,5-diketopiperazine (melting point 219°–221° C.) is mixed with 20 cc. of absolute alcohol and 8 cc. of an absolute ethanol solution of sodium methyl mercaptide containing one mol NaSCH₃ per liter. The mixture is heated to reflux for one hour, then cooled in ice-salt. After filtration, the residue is mixed with 6 cc. of concentrated hydrochloric acid and this mixture is heated under reflux for one hour. It is then evaporated to dryness and the residue extracted with two 15 cc. portions of boiling absolute alcohol. Pyridine is added to the solution until an excess is present. Methionine separates in the form of light brown crystals:

|  | C | H | N |
| --- | --- | --- | --- |
| Analysis: |  |  |  |
| Theory | 40.32 | 7.42 | 9.39 |
| Found | 40.36 | 7.58 | 9.24 |

The acetyl derivative of methionine prepared according to my invention has a melting point of 111–113° C., which is the same as the melting point of the acetyl derivative of methionine prepared by the malonic ester method. A mixed melting point determination showed no depression.

Example II

A solution of 128 gms. (111 cc., 1 mol.) of redistilled acetobutyrolactone in 300 cc. of methanol is prepared in a one-liter, three-necked flask equipped with a stirrer and a reflux condenser. The flask is immersed in a bucket of ice-salt, and when the temperature reaches −5°, 100 cc. (90 gms., 1.2 mols) of cold ethyl nitrite is added. The ice-bath is removed. The temperature rises to 37° within about one-half hour, and is maintained at 35°–40° C. by intermittent cooling for one and one-half hours, after which it falls to room temperature. The mixture is allowed to stand at room temperature for one and one-half hours, after which it is treated for the production of α-oximino-gamma-butyrolactone, which is converted to methionine in accordance with the procedure described in Example I.

Example III 10.7 gms. of α-oximino-gamma-butyrolactone, prepared according to the process of Example I, is dissolved in 100 cc. of methanol, and treated with hydrogen over 1.9 gms. of 5% charcoal-supported palladium chloride at room temperature and about 20 lbs. pressure. The reduction is complete in 13 minutes. The reduction product is treated as described in Example I, for the production of methionine.

Example IV 50 gms. of α-oximino-gamma-butyrolactone obtained by the method described in Example I, is dissolved in 500 cc. of methanol and treated with hydrogen over 3.5 gms. of 5% charcoal-supported palladium chloride at about 20 lbs. pressure. The reduction is complete in 30 minutes, the temperature rising from 25° C. to about 60° C. The catalyst is removed, and the methanol solution is allowed to stand at room temperature. The reduction product is treated in accordance with the procedure of Example I, for the production of methionine.

Example V 332 cc. (4 mols) of ethyl nitrite are added to a cold (0° C. to −5° C.) solution of 220 cc. (2 mols) of acetobutyrolactone in 500 cc. of methanol. The mixture is packed in ice-salt and allowed to stand from 15 to 20 hours, during which time it warms to room temperature. The excess ethyl nitrite partially evaporates during the latter part of this period; it is either led to the outdoors by means of a rubber tube, or is condensed in another cooled flask (−10° C.) for use in a subsequent run. The solution (at 20°–25° C.) is filtered. It contains some unchanged ethyl nitrite and suitable ventilation must be provided during the filtration step. The oxime collected is washed with cold n-butyl alcohol, then with ether. The mother liquor (not containing the washings) is evaporated to dryness under diminished pressure. The residue is heated with 100 cc. of n-butyl alcohol, and the mixture cooled and filtered. The solid is washed with two 50 cc. portions of cold n-butyl alcohol, then with ether. α-Oximino-gamma-butyrolactone of melting point 183–185° C. is obtained.

23 gms. of the oxime are dissolved in 100 cc. of methanol and hydrogenated over 2 gms. of charcoal-supported palladium chloride (5% palladium), at about 50 lbs. pressure. The theoretical amount of hydrogen is absorbed within 30 minutes. The catalyst is removed by filtration, and the solution is heated under reflux for 48 hours. It is then stored in a refrigerator for about 12 hours. The solid is collected by filtration, and washed with cold alcohol and cold ether. A 55–60% yield of 3,6-bis-(β-hydroxy ethyl)-2,5-diketopiperazine of melting point 186° C. is obtained.

15 gms. of the 3,6-bis-(β-hydroxy ethyl)-2,5-diketopiperazine are placed in an Erlenmeyer flask connected by means of wide-bore rubber tubing to one neck of a three-necked flask which is also fitted with a stirrer and a reflux condenser.

110 cc. of thionyl chloride are placed in the round-bottomed flask, and cooled to 0° to −5° C. The diketopiperazine is added. The mixture is stirred and allowed to come to room temperature slowly. The flask is then immersed in a water bath which is very slowly warmed until the thionyl chloride begins to reflux. The mixture is cooled and diluted with 75 cc. of dry ether. The solid is collected on a filter, washed twice with ether, then twice with water, and dried. A yield of 90–95% of 3,6-bis-($\beta$-chloro-ethyl)-2,5-diketopiperazine, in the form of a very light yellow or white solid, melting at 230–231° C., is obtained.

The thus obtained chloro compound is mixed with a solution containing a 10% excess of sodium methyl mercaptide (2.2 moles per mole of chloro compound) in absolute ethanol. Absolute ethanol is added until the total volume is about three liters per mol of chloro compound. The mixture is heated cautiously on the steam bath. As soon as reaction begins, the steam is turned off. Refluxing continues for about 10 minutes without external heat; when boiling subsides, steam is again applied until the total period of reflux is one hour. The boiling solution is filtered, and the filtrate cooled in ice water. The crystals are collected, and the mother liquor is used in another hot extraction of the original residue. The combined solids are then washed with water. 3,6-bis-($\beta$-methyl thiol-ethyl)-2,5-di-ketopiperazine is obtained as a white crystalline material melting at 225°–226° C. It may be recrystallized from ethanol to yield a product melting at 231°–232° C.

The 3,6-bis-($\beta$-methyl-thiol-ethyl)-2,5-diketopiperazine is mixed with concentrated hydrochloric acid (15 cc. per gm.) and heated under reflux for three hours. The solution is evaporated to dryness under diminished pressure, and the residue is dissolved in boiling absolute alcohol (20 cc. per gm.). This solution is clarified with charcoal, and while still hot, treated with pyridine (1–2 cc. per gm.), until an excess is present. Crystallization of dl-methionine begins immediately. The mixture is allowed to stand in the cold (0° to −5° C.) for about 12 hours, after which the product is collected and washed with cold absolute alcohol and then with absolute ether. The yield of dl-methionine is 85–95%.

Modifications may be made in carrying out the present invention, without departing from the spirit and scope thereof, and I am to be limited only by the appended claims.

I claim:

1. The process comprising reacting acetobutyrolactone with ethyl nitrite, at reduced temperature, hydrogenating the $\alpha$-oximino-gamma-butyrolactone thus obtained in the presence of a catalyst filtering out the catalyst and heating the filtrate, treating the 3,6-bis-($\beta$-hydroxy ethyl)-2,5-diketopiperazine thus formed with a substance selected from the group consisting of chlorinating and brominating agents, reacting the halogenated product with an alkali methyl mercaptan, and hydrolyzing the reaction product to dl-methionine.

2. The process comprising reacting acetobutyrolactone with ethyl nitrite in the presence of a small amount of mineral acid, at reduced temperature, hydrogenating the $\alpha$-oximino-gamma-butyrolactone thus obtained in the presence of a catalyst filtering out the catalyst and heating the filtrate, treating the 3,6-bis-($\beta$-hydroxy ethyl)-2,5-diketopiperazine thus formed with a substance selected from the group consisting of chlorinating and brominating agents, reacting the halogenated product with an alkali methyl mercaptan, and hydrolyzing the reaction product to dl-methionine in acid medium.

3. In a process for the production of $\alpha$-oximino-gamma-butyrolactone, the step comprising reacting acetobutyrolactone with ethyl nitrite, in the presence of hydrochloric acid, and at reduced temperature to form $\alpha$-oximino-gamma-butyrolactone.

4. In a process for the production of 3,6-bis-($\beta$-hydroxyethyl)-2,5-diketopiperazine, the steps comprising catalytically hydrogenating $\alpha$-oximino-gamma-butyrolactone filtering out the catalyst and heating the filtrate thereby forming 3,6-bis-($\beta$-hydroxy ethyl)-2,5-diketopiperazine.

5. In a process for the production of a 3,6-bis-($\beta$-halo-ethyl)-2,5-diketopiperazine, the step comprising reacting 3,6-bis-($\beta$-hydroxy ethyl)-2,5-diketopiperazine with a halogenating agent selected from the group consisting of chlorinating and brominating agents, to form the corresponding 3,6-bis-($\beta$-halo-ethyl)-2,5-diketopiperazine.

6. In a process for the production of 3,6-bis-($\beta$-chloro-ethyl)-2,5-diketopiperazine, the step comprising reacting 3,6-bis-($\beta$-hydroxy ethyl)-2,5-diketopiperazine with thionyl chloride, to form 3,6-bis-($\beta$-chloro-ethyl)-2,5-diketopiperazine.

7. In a process for the production of 3,6-bis-($\beta$-methyl-thiol-ethyl)-2,5-diketopiperazine, the step comprising reacting 3,6-bis-($\beta$-chloro-ethyl)-2,5-diketopiperazine with an alkali methyl mercaptide, to form 3,6-bis-($\beta$-methyl-thiol-ethyl)-2,5-diketopiperazine.

8. In a process for the production of 3,6-bis-($\beta$-methyl-thiol-ethyl)-2,5-diketopiperazine, the step comprising reacting 3,6-bis-($\beta$-chloro-ethyl)-2,5-diketopiperazine with sodium methyl mercaptide, to form 3,6-bis-($\beta$-methyl-thiol-ethyl)-2,5-diketopiperazine.

9. In a process for the production of dl-methionine, the step comprising hydrolyzing 3,6-bis-($\beta$-methyl-thiol-ethyl)-2,5-diketopiperazine in acid medium to form dl-methionine.

10. 3,6-bis-($\beta$-chloro-ethyl)-2,5-diketopiperazine.

11. 3,6-bis-($\beta$-methyl-thiol-ethyl)-2,5-diketopiperazine.

HAROLD R. SNYDER.